United States Patent Office 3,170,884
Patented Feb. 23, 1965

3,170,884
NAPHTHALENE DERIVATIVE SCINTILLATORS
Richard L. Macklin, Oak Ridge, Tenn., assignor to the United States of America as represented by the United States Atomic Energy Commission
No Drawing. Filed Feb. 19, 1962, Ser. No. 174,322
5 Claims. (Cl. 252—301.3)

This invention relates to scintillation detectors in which naphthalene derivatives are used as a base, covering a range of refractive indices overlapping the lead optical glasses, and to a detector which comprises a mixture of glass particles with a liquid scintillator, the liquid scintillator having a refractive index which matches that of the glass.

For detecting and measuring nuclear particles, liquid scintillators can be used. These scintillators usually comprise a solvent containing a primary solute or "activator" and a secondary solute or "spectrum shifter." The activator serves to collect the energy absorbed by the solvent, and the spectrum shifter converts the ultraviolet light emitted by the activator into visible light which is detectable by a photomultiplier tube. Examples of commonly used solvents are xylene and toluene. A common activator in PPO (2,5 diphenyloxazole), and a common spectrum shifter is POPOP (1,4-bis 2-(5-phenploxazolyl)-benzene).

When it is desirable to detect high-energy gamma rays with a liquid scintillator detector, such as the common xylene or toluene based detector, the dimensions and density of the detector must be sufficient to absorb the energy of the incident gamma rays. With high-energy gamma rays, scintillating crystals of the required size cannot be obtained, but liquid scintillators can be used. However, the density and atomic number of these above prior liquid scintillators are relatively low, necessitating the use of very large volumes. This in turn means that the output due to background radiation may be prohibitively large. However, the density of 1-methyl naphthalene of the liquid detector to be described below is 19% greater than that of toluene. For large scintillation detectors, its use can reduce the volume required by a factor of 1/1.6. Thus, the inherent problem of background radiation in conventional detectors becomes less of a problem in the 1-methyl naphthalene based liquid scintillator of the present invention.

The volume requirement can be further reduced by the use of lead glass particles which are mixed with the 1-methyl naphthalene based liquid scintillator having a refractive index which matches that of the glass.

The gamma ray detection efficiency of conventional liquid detectors at several mev. energy is relatively low and limited because of the lower pair production cross section due to the lower stopping power of the detector at these energies. However, the combined glass particles and liquid detector of this invention, to be described below, is very efficient in detecting high-energy gamma rays in the 5–10 mev. range, for example, because the stopping power of the detector, with its corresponding greater pair production cross section, increases with increasingly greater gamma ray energies in the above range rather than falling as in the organic scintillators.

With a knowledge of the limitations of prior liquid scintillators in detecting gamma rays, it is a primary object of this invention to provide a liquid scintillator which has a high refractive index and which can effectively detect high-energy gamma rays without excessive background rates.

It is another object of this invention to provide a scintillator in which glass particles are mixed with a liquid scintillator, having matched refractive indices.

It is still another object of this invention to provide a scintillator of mixed glass particles and solvent and having at least a 92% efficiency in detecting high-energy gamma rays in the mev. range.

These and other objects and advantages of this invention will become apparent upon a consideration of the following detailed specification.

In the liquid scintillator of this invention, the preferred solvent is 1-methyl naphthalene and the preferred primary and secondary solutes are PPO and POPOP, respectively. The scintillating liquid may be contained in a conventional spherical housing and is usable in sizes up to about 50 inches mean diameter without excessive background rates. The size of the liquid scintillator may range from about 2 inches mean diameter to the 50 inch size, depending on the use for the scintillator.

The concentration of the primary solute PPO may vary from 5 to 50 gm./liter and the range 5–30 gm./liter will give pulse heights within 5% of the maximum. The mean dispersion $(n_C - n_F)$ of a typical 1-methyl naphthalene scintillator solution preparation varied from 0.0165 to 0.0183 as a function of the PPO concentration. In purer samples of this scintillator solution, the mean dispersion can be as much as 0.028. The concentration of the secondary solute POPOP may vary from 0.1 to 1.0 gm./liter. The concentration ranges set forth above for the solutes are not critical and are given by way of example only. In some cases it may even de desirable to exceed them for reasons such as adjustment of the optical dispersion. It has been determined, however, that values of 10 gm./liter PPO and 0.1 gm./liter POPOP in 1-methyl naphthalene will produce near optimum scintillation intensity.

It has also been determined that a pulse height increase of about 10% can be achieved using no PPO primary solute but 0.5–1.0 gm./liter POPOP as the only solute.

The liquid scintillator described above is not limited to PPO and POPOP as the solutes since most other common solutes could be used (although it is known that terphenyl is not satisfactory as the primary solute). Also, 1-ethyl naphthalene can be used as the solvent in place of the 1-methyl naphthalene.

The refractive index D of 1-methyl naphthalene scintillator solutions is about 1.618. Such a scintillator can satisfactorily be used for detecting high-energy gamma rays. As pointed out above, for large scintillation detectors, the use of 1-methyl naphthalene as the solvent will reduce the volume required by a factor of 1/1.6.

Although the 1-methyl naphthalene based liquid scintillator is superior to the xylene or toluene based scintillator for use with high-energy gamma rays, it still is not as efficient as desired. It has been determined that a combined mixture of lead glass particles with a 1-methyl naphthalene based liquid scintillator will considerably reduce the volume required while at the same time provide a scintillator that is at least four times more efficient in detecting gamma rays in the mev. range.

It is important that the refractive indices of the glass particles and the liquid scintillator should match, in order that the light from the scintillations should follow a path of minimum length to the surface of the scintillator. If they do not match, the light is refracted at the surface of each glass particle and follows a devious path to the surface, in the course of which much of the light is absorbed.

The refractive indices of the flint glasses range from about 1.53 to over 1.9. The density (2.5–6.0 gm./cc.) is much higher than liquid scintillator densities, providing considerably greater stopping power for penetrating radiation, particularly gamma rays of several mev. energy. One suitable glass that can be used in the present invention is a medium flint glass which has about 42% PbO by weight, about 48% SiO$_2$, plus Na and Ca. This glass with the 42% lead content (with a density of about 3.60 and refractive index of 1.617) provides an appreciable pair production cross section above a few mev. of gamma ray energy, so that the stopping power increases between, say, 5 and 10 mev. rather than falling as in the organic scintillators. The improved pair process also improves the probability of producing a full energy scintillation as compared with the Compton process.

The 1-methyl naphthalene based scintillator liquid, with a D index of about 1.618, as discussed above, is used to mix with the glass particles in constructing the combined glass and solvent scintillator of this invention. The refractive index of the 1-methyl naphthalene can be adjusted to that of the glass by dissolving in this solvent a small amount of a liquid of lower refractive index such as toluene which does not interfere with the scintillation process. By using different proportions of 1-methyl naphthalene and an alkyl benzene (such as toluene) it would be possible to match glasses having refractive indices in the range 1.53 to 1.617. However, for use in detecting high-energy gamma rays, the preferred matching index is near the 1.617 value, corresponding to glass densities of about 3.6 and lead oxide content near 42%.

The mean dispersion of the glass should be matched as close as possible with that of the liquid scintillator. For a flint glass of density 3.6, the mean dispersion is given as 0.017. The corresponding value for the liquid scintillator, as discussed above, ranges from 0.0165 to 0.028, giving a mismatch less than 0.012. The mismatch in dispersion for 90° mean deflection at the extremities of the emission band of 1000-4000 angstroms is ±0.018, so the match attainable is more adequate.

The size of glass particles used will depend on the particular use for the scintillator. For example, to detect gamma rays of a few hundred kilovolts, a particle size near 0.0003 inch and a small volume detector would be required. For neutron capture work (5-10 mev. energies) the optimum particle size would lie in the range 0.003 to 0.008 inch. As the principle of operation is to sample the electron tracks at random, uniformity of particle size is not necessarily important. However, for purposes of computing the optical properties, it would be desirable to have the particles as uniform as possible. For detecting 5-10 mev. gamma rays, the glass particles should not be made smaller than 0.003 inch for two reasons. First, the 0.030 mev. beta and 0.047 mev. gamma radiation from any RaD (Pb-210) contaiminating the lead in the glass, would contribute directly to the background if the particles were much smaller. Secondly, the paths travelled by the scintillation light (and hence its attenuation by absorption) would be increased in length if more interfaces had to be traversed as would be the case if the particles were smaller.

The mixture of the glass and liquid scintillator should contain as much glass and as little liquid as possible, to give the maximum gamma ray absorption. The liquid/glass volume ratio can be about 40/60. The detector can be assembled by adding the liquid scintillator to a vessel full of the glass particles, taking care to exclude bubbles. The overall average density of such a detector will be near 2.4 gm./cc., nearly three times the density of the usual liquid scintillators. The secondary electrons will lose most of their energy in the glass and the light output will be only about one-fifth that of the liquid scintillator alone. However, for gamma rays of several mev. energy, this light output will still provide adequate phototube response.

A glass-liquid spherical detector of about ten-inch diameter (source of gamma rays at the center) will rival the performance of the large (40-50 inch) all-liquid detectors. A 30-inch glass-liquid spherical detector will provide over 94% total efficiency for detecting gamma rays. For some neutron capture gamma ray detection work, a flight path (hollow tube) through the detector is required. For ease of fabrication and to minimize losses through the tube, an equivalent truncated cylinder could be used instead of a sphere. As an example of such a cylinder, its dimensions could be 80 cm. x 80 cm. with a 10 cm. diameter axial hole. A detector of this size would provide a minimum total efficiency of about 92% for detecting gamma ray energies up to 10 mev.

In the combined glass-liquid scintillator, some degree of temperature control will be needed to provide and maintain an adequate match of the refractive indices of the glass and liquid because the scintillation liquids show a temperature variation of refractive index several times larger than for the usual glasses.

If the absorption mean free path for the light is large compared to the scintillator dimensions, the required temperature control is about ±40° around the match point. If the absorption mean free path for the scintillation light is more nearly comparable to the scintillator dimensions, an order of magnitude closer temperature control would be needed and can be easily achieved. This temperature control may be achieved by the standard procedures of thermal insulation, a copper liner, and electrical heaters thermostatically operated a few degrees above room temperature for control to a tenth of a degree or better. As the relative change in refractive index for 1-methyl naphthalene is 0.00027 per degree centigrade, it can be seen that very precise temperature control is not required to provide an adequate match of the refractive indices.

The glass used in the above scintillator may contain naturally radioactive materials such as potassium, thorium, and uranium. However, for a usable detector, the background from these materials should be below, say, 1000 c./s. Such a counting rate corresponds to 600 p.p.m. K, 450 p.p.m. U, and 1.5 p.p.m. Th for the main high-energy component for a 200 liter scintillator.

It should be noted that glasses other than flint glasses could be used in the detector. For example, boron-containing or gadolinium-containing glasses could be used for neutron measurements.

This invention has been described by way of illustration rather than limitation and it should be apparent that this invention is equally applicable in fields other than those described.

What is claimed is:

1. An improved liquid scintillator for detecting high-energy gamma rays in the mev. energy range consisting essentially of 1-methyl naphthalene as the solvent of said scintillator, 2,5 diphenyloxazole as the primary solute of said scintillator, said primary solute having a concentration in the range of 5-50 gm./liter, and 1,4-bis 2-(5-phenyloxazolyl)-benzene as the secondary solute of said scintillator, said secondary solute having a concentration in the range of 0.1-1.0 gm./liter.

2. The scintillator set forth in claim 1, wherein said primary solute concentration is about 10 gm./liter, and said secondary solute concentration is about 0.1 gm./liter.

3. An improved scintillator consisting essentially of a scintillating solution consisitng of 1-methyl naphthalene as the solvent of said scintialtor, 2,5 diphenyloxazole as the primary solute of said scintillator, said primary solute having a concentration in the range of 5-50 gm./liter, and 1,4-bis 2-(5-phenyloxazolyl)-benzene as the secondary solute of said scintialtor, said secondary solute having a concentration in the range of 0.1-1.0 gm./liter; flint glass particles disposed within said solution, asid particles being, by weight, about 42% PbO, about 48% SiO$_2$, plus Na and Ca, having a density of about 3.60 and a refractive index of substantially 1.617; and a small amount of toluene mixed with said solvent to provide a match of the refractive index of the glass particles with that of the liquid scintillator.

4. The scintilaltor of claim 3 having a spherical configuration with a mean diameter in the range from 2-50 inches, and wherein the liquid/glass volume ratio is about 40/60.

5. The scintillator set forth in claim 3, wherein the size of the glass particles is in the range of 0.003 to 0.008 inch.

References Cited by the Examiner

UNITED STATES PATENTS

| | | | |
|---|---|---|---|
| 2,828,423 | 3/58 | Scherbatskoy | 250—71.5 |
| 2,985,593 | 5/61 | Broderick et al. | 252—408 |
| 3,068,178 | 12/62 | Kallmann et al. | 252—408 |

FOREIGN PATENTS 592,865   2/60   Canada.

OTHER REFERENCES

"A Lead Glass Cerekow Radiation Photon Spectrometer," Univ. of California, Radiation Laboratory, printed for U.S.A.E.C., 1956.

JULIUS GREENWALD, *Primary Examiner*.